United States Patent [19]

Rau

[11] Patent Number: 5,287,278
[45] Date of Patent: Feb. 15, 1994

[54] METHOD FOR EXTRACTING COMPANY NAMES FROM TEXT

[75] Inventor: Lisa F. Rau, Clifton Park, N.Y.

[73] Assignee: General Electric Company, Schenectady, N.Y.

[21] Appl. No.: 825,896

[22] Filed: Jan. 27, 1992

[51] Int. Cl.5 .............................. G06F 15/40
[52] U.S. Cl. ................................. 364/419.1
[58] Field of Search .......................... 364/419

[56] References Cited

U.S. PATENT DOCUMENTS

| | | | |
|---|---|---|---|
| 4,965,763 | 10/1990 | Zamora | 364/900 |
| 4,994,967 | 2/1991 | Asakawa | 364/419 |
| 5,161,105 | 11/1992 | Kugimiy et al. | 364/419 |
| 5,182,709 | 1/1993 | Makus | 364/419 |

*Primary Examiner*—Roy N. Envall, Jr.
*Assistant Examiner*—A. Bodendorf
*Attorney, Agent, or Firm*—Paul R. Webb, II

[57] ABSTRACT

A method for extracting company names from textual information uses a combination of heuristics, exception lists, and extensive corpus analysis. The method first locates company name suffixes (i.e., Company, Corporation) and attempts to locate the beginning of the company name. The method works on both mixed-case text and capitalized text. Upon identification of a company name, the method proceeds to generate variations of the name for later extraction.

3 Claims, 1 Drawing Sheet

METHOD FOR EXTRACTING COMPANY NAMES FROM TEXT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention relates generally to automated information retrieval, and more particularly to a system and method for extracting company names from text.

One of the major problems in the accurate analysis of natural language is the presence of unknown words, especially names. While names account for a large percentage of the unknowns in a text, they can also be the most important piece of information in a text; for what the text is about (topic analysis), for extracting information from text (data base generation), and for indexing a text for full-text retrieval.

Company names are particularly important for knowledge-based financial applications. With mixed case input, a program can easily extract company names by looking backward from a company name indicator (i.e., Incorporated, Corporation, etc.) to the first non-capitalized word. This simple heuristic fails to correctly identify approximately 10% of real company names and fails entirely with upper case input.

What is needed is a more accurate method which extracts company names from mixed case text and which also works for upper case text.

SUMMARY OF THE INVENTION

In accordance with the present invention, there is provided a method for extracting company names from text using a combination of heuristics, exception lists, and extensive corpus analysis. The method first locates a company suffix and then reads backwards from the suffix. With mixed case input, the method utilizes a combination of searching for the first non-capitalized word and special heuristics for dealing with embedded conjunctions and other non-capitalized words. With upper case input, the method utilizes an empirically derived stoplist, company word length restrictions, and lexical lookup to determine the start of a company name. Once a company name is identified, the invention generates the most likely variations that those names may go by for use in subsequent retrieval.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE INVENTION

The present invention is specifically directed to a company name extraction method. It is contemplated that the present invention could be utilized in a larger automated natural language text processing system which includes other modules, for example, for performing syntactic segmentation of the text as an aid to understanding certain sentences and helping to identify points within sentences which could not be included in the boundaries of a company name (phrase boundaries). The present invention has been implemented on a SUN Workstation using LISP as a source language, although it is contemplated that other languages and/or computers could be used to practice the present invention.

The LISP source code which can be used to implement the present invention is provided in Appendix A. An overall description of the process, as performed by a computer in response to the source code in Appendix A, makes up the rest of the detailed description of the present invention.

The program first scans through the input text, looking for company name indicators. If the text is mixed-case, a word must begin with a capital letter in order to be an indicator. The following words are indicators (words prefaced by ABBREV must have periods after them).

| ABBREV_INC | ABBREV_LTD | ABBREV_CORP |
|---|---|---|
| ABBREV_CO | ABBREV_PLC | ABBREV_AG |
| ABBREV_COS | ABBREV_LP | ABBREV_L.P |
| CORP | INC | LTD |
| CO | PLC | AG |
| NV | CSF SA | ABBREV_ENTRP |
| ABBREV_S.A | ABBREV_SA | ABBREV_PTY.LTD |
| ASSOCIATES | COMPANY | COMPANIES |
| CORPORATION | INCORPORATED | LIMITED |
| PARTNERS | | |

After a company name indicator is detected, the program looks backwards to determine where the company name begins. If the indicator is NV or CO, it makes sure the previous word is not a city in Nevada or Colorado, respectively. If it is, no company name is extracted. Otherwise, the program looks at up to six words, not including punctuation, that appears before the indicator. If no other stop condition occurs, all six words are taken to be the constituents of the company name and it is extracted.

There are several stop conditions which will each be described.

Additional company name indicators that appear before the final indicator are included as a part of the company name being extracted. One stop condition occurs when the program encounters one of the following words in all-caps input:

ABOUT ABOVE ACQUIRE ACQUIRES ACQUIRING AFFILIATE AFFIRMS AFTER
AGAINST ALL ALLOW AN APPROVES ARE AS AT
BELIEVES BE BEFORE BEGIN BETWEEN BOTH BOUGHT BUY BUYS BY
CERTAIN COMPANY COMPLETES CONCERN CONNECT CONTACT COVER
DIRECTORS DISTRIBUTE DOWNGRADES
EST EVEN EXPECT
FILES FOR FORCE FORMER FORMERLY FRIDAY FROM

```
GROUP
HAD HAS HAVE HE HELD
IN INACTIVE INCLUDE INCLUDES INCLUDING INITIAL
INVOLVE INTO IT ITS IS
JOINS
LEAVING LEFT LONGTIME
MAKER MEAN MONDAY
NAME NEWSWIRE
ON ONE OR OTHER OUT OUTSTANDING OVER OWN OWNS
PARENT PARTNER PR PRESIDENT PUBLISHER PURCHASE
REQUIRE RESUMED RETAILER
SAID SAYS SAY SATURDAY SHOWS SOLD SPLIT
STOP SELL SUBSIDIARY SUBSIDIARIES SUNDAY
TEXT TO TODAY THAN THAT THE THEIR
THREATENING THROUGH THURSDAY TUESDAY
UNDER UNIDENTIFIED UNIT UNTIL UPI USE USING USUAL
VIA VS
WAS WEAKENS WEDNESDAY WERE WHEN WHEREBY WHICH WIRE WITH
YESTERDAY
```

If any of the above words are encountered, the company name extracted beings after the word. for the following words, the Company name is assumed to start with the word:

```
UNITED APPLIED ALLIED CONSOLIDATED DIVERSIFIED
INTEGRATED ADVANCED
```

Another stop condition occurs when the program encounters a non-capitalized word in mixed-case input that is not a coordinator. Coordinators are:

| AND | DE | VAN | DU | OF |
|-----|----|----|----|----|

Company names containing only an indicator are not allowed.

If an AND appears within the six-word window and either there are more than 2 commas within this window, the company name extracted begins with the word after the AND.

If an OF appears within the six-word window and the word directly before the OF is one of the following:

| BOARD | DIVISION | OFFICER |
| PROGRAM | PROGRAMS | DIRECTOR |
| SHAREHOLDERS | | EXECUTIVE | or the words directly before the OF constitute a person name, then the company name extracted begins with the word after the OF.

Figure 1:
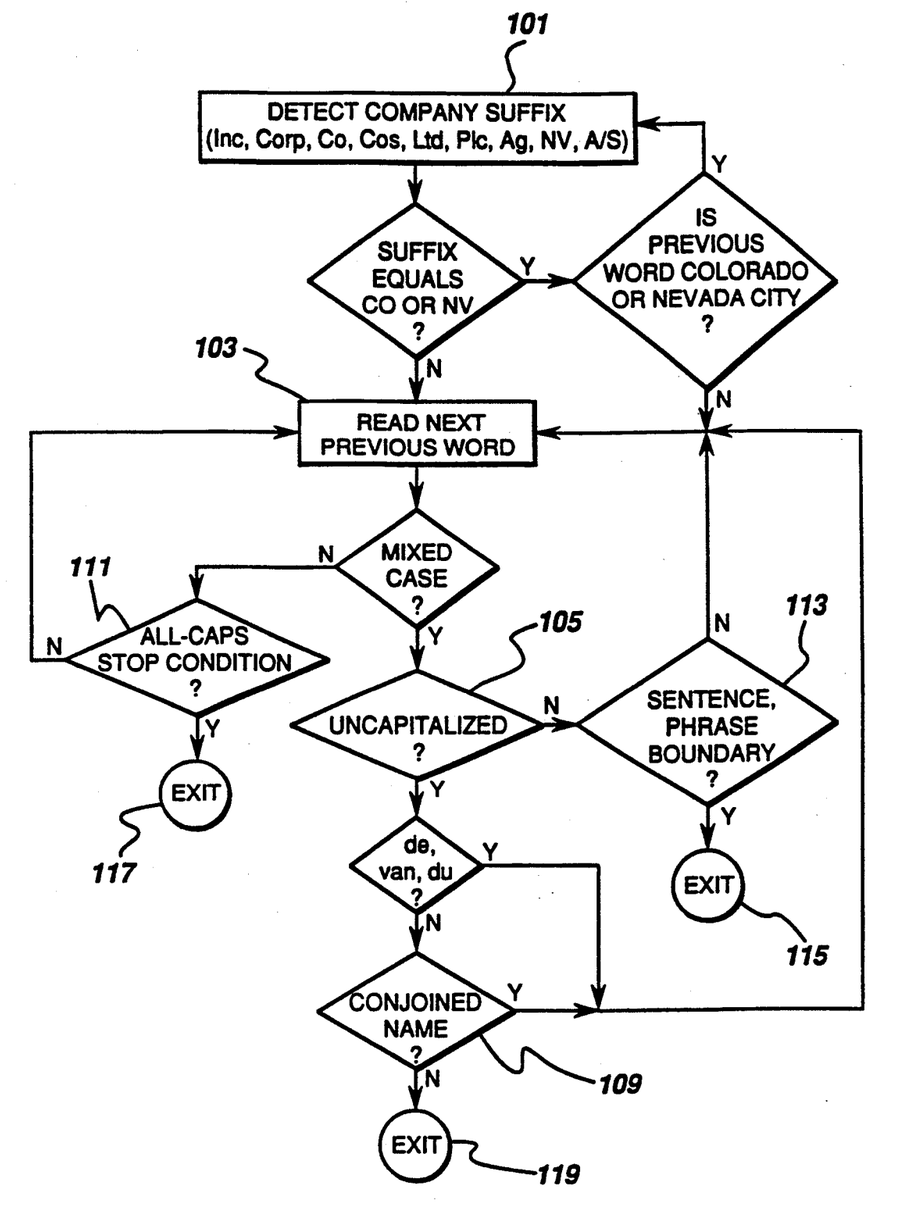
The single Figure is a flowchart of the method of the present invention.

If the word AND appears and conjoins another company name, and there is parallel sentence structure or plural verbs, the company name extracted begins with the word after the AND. An example of parallel sentence structure is IBM, GE and HP each . . . or IBM, GE, and HP all.

and NV to make sure they are not state abbreviations. At block 103 words are read one at a time up to six words before the suffix. If the text is mixed case, the method checks for an uncapitalized word at 105. If the If the symbol & appears, the company name extracted terminates according to the normal stop condition or at the first comma detected.

If there is a comma within the words under consideration, the sentence is bracketed with respect to syntactic segmentation. If the word or words before the comma belong to a separate syntactic constituent, they are not included in the company name.

Referring now to the single Figure, there is shown a flowchart of the method of the present invention. The method begins at 101 by detecting a company suffix. As described above, the program checks the suffixes CO word is uncapitalized and not de, van, or du, then the company name is extracted and the program exits at 107. If the word is capitalized, it is taken as part of the company name unless it is on a sentence or phrase boundary as determined at 113. If a sentence or phrase boundary is detected, the program exits at 115. The test for a conjoined name at 109 refers to the situation when the word AND appears in a company name as discussed above. If the AND is not part of the company name, the program exits at 119. If the text is all caps, the various stop conditions described above are checked for at 111. If a stop condition is found, the program exits at 117. Company names located can be stored in a database and used for future detection of those company names (and variations, such as without the suffix, etc.) previously identified.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

Appendix A

```
(in-package 'user)

(eval-when (compile)
    (nlt-load "Release/globals")
    (nlt-load "Release/structures")
    (nlt-load "Release/macros")
    (nlt-load "Release/util")
    (nlt-load "Release/know")
    (nlt-load "Release/lexbase")
    (nlt-load "Release/text")
    (nlt-load "Geis/modules")
    )

(nlt-provide 'nlt-cnames)

(defconstant *nickname-stoplist*
  '(AMERICAN AUSTRALIAN
    BANK BRITISH
    C CANADA CANADIAN CAPITAL COMMERICIAL COMMUNICATIONS COMPUTER CONSOLIDATED
    DATA
    EAST ELECTRONIC ELECTRIC
    FACTORY FEDERAL FINANCIAL FIRST
    GENERAL GROUP
    JOHN
    INDEPENDENT INTERNATIONAL INTL INVESTORS
    NATIONAL NETWORK NEW NEWS NORTH
    RESEARCH
    SECURITIES SERVICE SOFTWARE SONS SOUTH STANDARD SYSTEMS SYSTEM
    T TECHNOLOGY
    UNION UNITED
    WEST))

(defconstant *abbrev-stoplist*
  '(AN AM AS AT BE BY GO IF IN IS IT ITS
    ME MY NO OF OH ON OR SO ST TO UP US WE))

(defconstant *ed-stoplist*
  '(UNITED APPLIED ALLIED CONSOLIDATED DIVERSIFIED INTEGRATED ADVANCED))

(defconstant *nocap-name-parts*
  '(VAN DE DU))

(defconstant *of-stoplist*
  '(BOARD DIVISION OFFICER PROGRAM PROGRAMS DIRECTOR SHAREHOLDERS EXECUTIVE))

(defconstant *stop-list*
  '(A ABBREV_CHG
    ABOUT ABOVE ACQUIRE ACQUIRES ACQUIRING AFFILIATE AFFIRMS AFTER
    AGAINST ALL ALLOW AN APPROVES ARE AS AT
    BELIEVES BE BEFORE BEGIN BETWEEN BOTH BOUGHT BUY BUYS BY
    CERTAIN COMPANY COMPLETES CONCERN CONNECT CONTACT COVER
    DIRECTORS DISTRIBUTE DOWNGRADES
    EST EVEN EXPECT
    FILES FOR FORCE FORMER FORMERLY FRIDAY FROM
    GROUP
    HAD HAS HAVE HE HELD
```

IN INACTIVE INCLUDE INCLUDES INCLUDING INITIAL
INVOLVE INTO IT ITS IS
JOINS
LEAVING LEFT LONGTIME
MAKER MEAN MONDAY
NAME NEWSWIRE
ON ONE OR OTHER OUR OUTSTANDING OVER OWN OWNS
PARENT PARTNER PR PRESIDENT PUBLISHER PURCHASE
REQUIRE RESUMED RETAILER
SAID SAYS SAY SATURDAY SHOWS SOLD SPLIT
STOP SELL SUBSIDIARY SUBSIDIARIES SUNDAY
TEXT TO TODAY THAN THAT THE THEIR
THREATENING THROUGH THURSDAY TUESDAY
UNDER UNIDENTIFIED UNIT UNTIL UPI USE USING USUAL
VIA VS
WAS WEAKENS WEDNESDAY WERE WHEN WHEREBY WHICH WIRE WITH
YESTERDAY
))

(defconstant *exception-stop-list*
 '(COMPANY GROUP))

(defconstant *punc-stop-list*
 '(*COMMA* *SEMICOLON* *DOUBLEQUOTE* *RIGHT_PAREN* *QUESTION*
*COLON* *DASH*
   *HEADLINE* *LEFT_PAREN* *NUMBER* *MINUS* *EOB* *BACKSLASH*
*EQUAL* *WHITESPACE*))

(defconstant *punc-skip-list*
 '(*AMPERSAND* *APOSTROPHE* *APOSTROPHE-S*))

(defconstant *abbrev-list*
 '(ABBREV_INC ABBREV_LTD ABBREV_CORP ABBREV_CO
    ABBREV_PLC ABBREV_AG ABBREV_COS ABBREV_LP
    ABBREV_L.P CORP INC LTD CO PLC AG NV CSF SA
    ABBREV_ENTRP ABBREV_S.A ABBREV_SA
    ABBREV_PTY.LTD
    ))

(defconstant *full-list*
 '(ASSOCIATES COMPANY COMPANIES CORPORATION FACTORY
INCORPORATED LIMITED PARTNERS))

(defconstant *exchange-list*
 '(NYSE NASDAQ PSE BSE OTC AMEX))

(defconstant *co-cities*
 '(BOULDER BROOMFIELD BUTTE DENVER ENGLEWOOD FRANKTOWN
GOLDEN LAFAYETTE LAKEWOOD
    LONGMONT LOUISVILLE SPRINGS))

(defconstant *nv-cities*
 '(VEGAS RENO))

(defvar *cname.out* "cname.entry")

;;;;;;;;;;;;;;;;;;;;;;;;;;;;;;;;;;;;;;;;;;;;;;;;;;;;;;;;;;;;;;;;;;;;;;;;;;;;;
;;;                                             ;;;
;;; Name: novar-cond                            ;;;
;;;                                             ;;;
;;; Author: Rau                                 ;;;
;;;     Mon Jun  4 14:54:44 1990                ;;;
;;;                                             ;;;
;;; Args: bl -- variation                       ;;;
;;;     abbrev-flag -- flag if is ab abbreviation ie ABBREV_U   ;;;

```
;;;                                                    ;;;
;;; Description: determines if there is a reason not to make a variation   ;;;
;;;                                                    ;;;
;;; Returns: t if its an OK variation for a company name, else nil    ;;;
;;;                                                    ;;;
;;;;;;;;;;;;;;;;;;;;;;;;;;;;;;;;;;;;;;;;;;;;;;;;;;;;;;;;;;;;;;;;;;;;;;;;;;;;

(defun novar-cond (bl abbrev-flag)
  (let ((nogood-vars (append *nickname-stoplist* *exchange-list*)))
    (and (null (string-equal
                 (subseq (string (car (last bl))) 0 1) "'*"))
         (null (and (member (car (reverse bl)) nogood-vars)
                    (= (length bl) 1)))
         (null (and (= (length bl) 1)
                    (= (length (string (car bl))) 1)))
         (null (member (car (last bl)) '(OF AND *AMPERSAND*)))
         (null (place-name bl))
         (null abbrev-flag))))

(defun place-name (bl)
  (declare (ftype (function (t) t) traverse-multi-token))
  (let ((pl-types '(state-name nation-name continent-name city-name)))
    (cond
      ((= (length bl) 1)
       (some #'(lambda (x) (q-token-p x (car bl))) pl-types))
      (t
       (cadr (some #'(lambda (x)
                       (find x
                             (get1 (get1 (traverse-multi-token bl) '*mtoken*) '*mtoken*)
                             :key #'cadr))
                   pl-types))
       ))
    ))

(defun capitalized-p ($tok)
  (or (nlt-module-setting :input :all-caps)
      (upper-case-tok-p $tok)
      (member (tok-name $tok) '(OF AND))
      (and (not (nlt-module-setting :input :all-caps))
           (all-caps-tok-p $tok))
      (= (length (tok-string $tok)) 1)))

(defmacro dj-triggers (cadr-abb)
  `(member ,cadr-abb '(DJ CLOSE CORRECTING SOURCE AP *MINUS*)))

(defmacro skip-this-amount (words newsymbols)
  `(nthcdr (1+ (length ,newsymbols)) ,words))

(defun company-p (tok)
  (if (q-token-p 'cname tok)
      t
      nil))

(defun holding-company-p (listofnames)
  (declare (ignore listofnames))
  nil)

(defun cnames (file)
  (declare (ftype (function (t) t) nlt-input set-up-tok-buffer reset-lexicon))
  (nlt-input file)
  (setf *learn-cnames* t)
  (do ((input (set-up-tok-buffer)    ;; :return-type :paragraph
              (set-up-tok-buffer))   ;; :return-type :paragraph
```

```lisp
       (cnt 0 (1+ cnt)))
     ((and input
       (eq '*quit* (peek-char nil *nlt-input* nil '*quit*)))
       (nlt-input))
     (format t "Article ~s processed~%" cnt)
     ;; clear out buffered lexical entries
     (if (= (rem cnt 5) 0)
  (clrhash *derived-lexicon*))
     ;; this deletes all temporary entries
     (if (= (rem cnt 100) 0)
  (reset-lexicon))
     ))

(defun extract-all-cnames (buffer)
  (do* ((bl buffer)
   (ptr (position-if #'(lambda (x)
             (member (tok-name x) *eos-markers*))
       bl)
        (position-if #'(lambda (x)
             (member (tok-name x) *eos-markers*))
       bl)))
      ((or (null ptr) (null bl)))
    (extract-cnames (subseq bl 0 (1+ ptr)))
    (setq bl (nthcdr (1+ ptr) bl))))
```

```
;;;;;;;;;;;;;;;;;;;;;;;;;;;;;;;;;;;;;;;;;;;;;;;;;;;;;;;;;;;;;;;;
;;;                                                           ;;;
;;; Name: not-nv-or-co-city                                   ;;;
;;;                                                           ;;;
;;; Author: Rau                                               ;;;
;;;         Mon Jun  4 14:56:39 1990                          ;;;
;;;                                                           ;;;
;;; Args: 'words -- buffer of current words                   ;;;
;;;                                                           ;;;
;;; Description: determines if company under consideration is a city in ;;;
;;;              co or nv, ie Boulder, CO is not the Boulder Company    ;;;
;;;                                                           ;;;
;;; Returns: t or nil                                         ;;;
;;;                                                           ;;;
;;; Example:                                                  ;;;
;;;                                                           ;;;
;;;;;;;;;;;;;;;;;;;;;;;;;;;;;;;;;;;;;;;;;;;;;;;;;;;;;;;;;;;;;;;;
```

```lisp
(defun not-nv-or-co-city (words)
  (cond ((null (cdr words)) t)
    ((or (member (tok-name (car words)) '(CO NV))
         (equal (tok-name (car words)) 'ABBREV_CO))
     (if (member (tok-name (cadr words))
            (append *nv-cities* *co-cities*)) nil
       (null (and (cddr words)
             (equal (tok-name (cadr words)) '*COMMA*)
             (member (tok-name (caddr words))
                (append *nv-cities* *co-cities*))))))
    (t)))
```

```
;;;;;;;;;;;;;;;;;;;;;;;;;;;;;;;;;;;;;;;;;;;;;;;;;;;;;;;;;;;;;;;;
;;;                                                           ;;;
;;; Name: extract-cnames                                      ;;;
;;;                                                           ;;;
;;; Author: Rau                                               ;;;
;;;         Mon Jun  4 15:01:23 1990                          ;;;
;;;                                                           ;;;
;;; Args: text -- just that                                   ;;;
;;;                                                           ;;;
;;; Description: extract company names from a lex buffer      ;;;
;;;                                                           ;;;
;;; Returns: nothing important                                ;;;
;;;                                                           ;;;
;;;                                                           ;;;
;;;                                                           ;;;
;;;;;;;;;;;;;;;;;;;;;;;;;;;;;;;;;;;;;;;;;;;;;;;;;;;;;;;;;;;;;;;;
```

```
(defun extract-cnames (text)
  (declare (special *new-cname*))
  (setf *new-cname* nil)
  ;; make sure all caps flag is set
  (if (some #'(lambda (tk) (some #'lower-case-p (tok-string tk)))
           text)
      (setf (nlt-module-setting :input :all-caps) nil)
      (setf (nlt-module-setting :input :all-caps) t))
  (let ((cname-stream-out
         (nlt-open *cname.out* :direction :output
          :if-exists :append
          :if-does-not-exist :create))
         )
    (do* ((i 0 (+ i 1))
          (prevwords nil (cons (car words) prevwords))
          (words (reverse text) (cdr words)))
         ((null words))
      (cond ((and (equal (tok-name (car words)) 'ABBREV_N)
                  prevwords
                  (eq (tok-name (car prevwords)) 'ABBREV_V)
                  )
             (setf words
                   (skip-this-amount
                    words
                    (get-possible-names words nil cname-stream-out (car prevwords)))))
            ((and (equal (tok-name (car words)) 'A)
                  (cdr prevwords)
                  (eq (tok-name (car prevwords)) '*SLASH*)
                  (eq (tok-name (cadr prevwords)) 'S))
             (setf words
                   (skip-this-amount
                    words
                    (get-possible-names words nil cname-stream-out (car prevwords)))))

((and (member (tok-name (car words)) *abbrev-list*)
                  prevwords
                  (not (eq (tok-name (car prevwords)) '*HYPHEN*))
                  (not-nv-or-co-city words))
             (setf words (skip-this-amount words
                           (get-possible-names
                            words
                            (subseq (tok-string (car words)) 0 1)
                            cname-stream-out (car prevwords)))))
            ((and (member (tok-name (car words)) *full-list*)
                  (not (string= (tok-string (car words)) "")))
             (let ((firstlet (subseq (tok-string (car words)) 0 1)))
               (if (member firstlet '("C" "I" "A" "L") :test 'string=)
                   (setf words
                         (skip-this-amount
                          words
                          (get-possible-names words firstlet
                             cname-stream-out (car prevwords)))))))
            )
      (close cname-stream-out)
      *new-cname*))
(defun get-all-tokens (tokstring)
  (declare (ftype (function (t) t) read-text))
  (let ((res nil) (cis *cis*) (cisp *cisp*) (cisl *cisl*))
    (setf *cis* (string-append tokstring "*QUIT*")
          *cisp* 0
          *cisl* (length *cis*))
    (setf res (butlast (read-text :istream *standard-input*)))
    (setf res (remove-if #'punct-token-p res))
    (setf *cis* cis
          *cisp* cisp
          *cisl* cisl)
    (mapcar #'tok-name res)))
```

```
;;;;;;;;;;;;;;;;;;;;;;;;;;;;;;;;;;;;;;;;;;;;;;;;;;;;;;;;;;;;;;;;;;;;;;;;;;
;;;                                              ;;;                   ;;;
;;; Name: get-possible-names                     ;;;                   ;;;
;;;                                              ;;;                   ;;;
;;; Author: Rau                                  ;;;                   ;;;
;;;         Mon Jun  4 15:02:24 1990             ;;;                   ;;;
;;;                                              ;;;                   ;;;
;;; Args: abbrev -- list of words that could be in company name        ;;;
;;;       cname-stream-out -- output stream      ;;;                   ;;;
;;;                                              ;;;                   ;;;
;;; Description: get the name of a company       ;;;                   ;;;
;;;                                              ;;;                   ;;;
;;; Returns: the words in the company name       ;;;                   ;;;
;;;                                              ;;;                   ;;;
;;;                                              ;;;                   ;;;
;;;;;;;;;;;;;;;;;;;;;;;;;;;;;;;;;;;;;;;;;;;;;;;;;;;;;;;;;;;;;;;;;;;;;;;;;;

(defun get-possible-names (abbrev firstlet cname-stream-out prevword)
  (declare (ftype (function (t) t) punct-token-p))
  (let ((newsymbols nil)
        (stop nil)
        (cadr-abb nil)
        (car-abbrev (tok-name (car abbrev)))
        (totlist (append *stop-list* *punc-stop-list* *abbrev-list*)))

(do* ((i 0 (+ i 1))
          (abb (cdr abbrev) (cdr abb)))
         ((or (= i 6) stop (null abb)))
      (if (cdr abb)
          (setf cadr-abb (tok-name (cadr abb)))
          (setf cadr-abb nil))
      (let ((newword (tok-name (car abb))))
        (cond ((or (member newword *punc-skip-list*)
                   (and (= i 0)
                        (member newword '(*COMMA* *MINUS*)))
                   (and (= i 0)
                        (equal newword '*COMMA*)
                        (member car-abbrev '(CO ABBREV_CO)))
                   (and (= i 0)
                        (member newword *abbrev-list*)))
               (setf newword nil))
              ((and (equal newword '*MINUS*)
                    (or (and cadr-abb
                             ;; below for dow jones
                             (or (dj-triggers cadr-abb)
                                 ;; below for IEDB
                                 (member cadr-abb '(WIRE NEWSWIRE))))
                        (= i 6)
                        (null (cdr abb))))
               (if (null newword) (setf stop t)
                   (setf stop newword)))
              ((and (null (= i 0))
                    (member newword '(OF AND *AMPERSAND*))
                    (not-hard-company-name? (car abb) abbrev prevword))
               (setf stop newword)
               (setf newword nil))
              ((and (equal newword '*COMMA*)
                    (full-of-commas abbrev))
               (setf stop newword)
               (setf newword nil))
              ((company-p newword)
               (setf newsymbols
                     (append
                      (get-all-tokens (tok-string (car abb))) newsymbols)))
              ((or (null newword)
                   (numberp newword)
```

```
        (and (numeric-tok-p (car abb))
        (not (punct-token-p newword))
        (not (contraction-token-p newword)))
          (symbol-to-number newword)
          (and (not (capitalized-p (car abb)))
        (not (member newword *nocap-name-parts*))
        (or (not (equal cadr-abb '*HYPHEN*))
            (and (equal cadr-abb '*HYPHEN*)
        (equal newword 'BASED))))
          (totlist-test (car abb) totlist abbrev i)
          (ed-test (car abb));; unnecessary
         )
           (if (null newword) (setf stop t) (setf stop newword)))

((and (not (punct-token-p newword))
         (not (contraction-token-p newword)))
           (push newword newsymbols)))))
      (if newsymbols
    (if (member (car newsymbols) '(AND OF *AMPERSAND*))
        (setf newsymbols (cdr newsymbols))))
     (if (and newsymbols
           (member 'AND newsymbols)
           (member stop '(IN OF BY)))
    (setf newsymbols (cdr (member 'AND newsymbols))))
      (if newsymbols
    (make-new-cname newsymbols firstlet cname-stream-out))
      newsymbols))
```

```
;;;;;;;;;;;;;;;;;;;;;;;;;;;;;;;;;;;;;;;;;;;;;;;;;;;;;;;;;;;;;;;;;;;;;;;;;;
;;;                                                                    ;;;
;;; Name: not-hard-company-name?                                       ;;;
;;;                                                                    ;;;
;;; Author: Rau                                                        ;;;
;;;         Mon Jun  4 15:03:30 1990                                   ;;;
;;;                                                                    ;;;
;;; Args: newword -- current word                                      ;;;
;;;       abbrev -- rest of potential words in company name            ;;;
;;;                                                                    ;;;
;;; Description: determines if company name is a conjunction           ;;;
;;;                                                                    ;;;
;;; Returns: t if it is not a hard company name, else nil              ;;;
;;;                                                                    ;;;
;;; Example:                                                           ;;;
;;;                                                                    ;;;
;;;;;;;;;;;;;;;;;;;;;;;;;;;;;;;;;;;;;;;;;;;;;;;;;;;;;;;;;;;;;;;;;;;;;;;;;;

(defun full-of-commas (abbrev)
  (> (length
       (mapcan #'(lambda (l)
         (if (equal (tok-name l) '*COMMA*) (list l))) abbrev)) 2))

(defun not-hard-company-name? (newword abbrev prevword)
  (declare (ftype (function (t) t) abbrev-p))
  (let ((rest (cdr (member newword abbrev)))
    (tok-new (tok-name newword)))
     (cond (rest
       (if (and (member tok-new '(OF AND *AMPERSAND*))
         (and (or (capitalized-p (car rest))
           (member (tok-name (car rest)) *nocap-name-parts*))
       (not (abbrev-p (car rest)))
       (not (and (equal tok-new 'OF)
           (equal (tok-name
             (car (last abbrev))) 'CONTACT)))
       (not (and (equal tok-new 'and)
           (equal (tok-name prevword) 'each)))
```

```
       (not (full-of-commas abbrev))
       (not (member (tok-name (car rest)) *of-stoplist*))
       (null (company-p (tok-name (car rest))))))
         (if (cdr rest)
       (if (member (tok-name (cadr rest)) '(OF AND *AMPERSAND*))
         t
         nil)
       nil)
     t))
    (t t))))
```

```
;;;;;;;;;;;;;;;;;;;;;;;;;;;;;;;;;;;;;;;;;;;;;;;;;;;;;;;;;;;;;;;;;;;;;;;;;
;;;                                                                   ;;;
;;; Name: totlist-test                                                ;;;
;;;                                                                   ;;;
;;; Author: Rau                                                       ;;;
;;;         Mon Jun 4 15:05:15 1990                                   ;;;
;;;                                                                   ;;;
;;; Args: newword -- current word in list of words in cname           ;;;
;;;       totlist -- list of stopwords                                ;;;
;;;       abbrev -- list of words in cname                            ;;;
;;;       i -- index into list                                        ;;;
;;;                                                                   ;;;
;;; Description: determines where to start the company name           ;;;
;;;                                                                   ;;;
;;; Returns: t or nil                                                 ;;;
;;;                                                                   ;;;
;;;                                                                   ;;;
;;;;;;;;;;;;;;;;;;;;;;;;;;;;;;;;;;;;;;;;;;;;;;;;;;;;;;;;;;;;;;;;;;;;;;;;;

(defun totlist-test (newword totlist abbrev i)
  (let ((nword (tok-name newword)))
    (cond ((and (= i 0)
        (member nword *exception-stop-list*))
      nil)
     ((null (member nword totlist))
      nil)
     ((and (member nword '(AND *AMPERSAND*))
       (cdr (member newword (reverse abbrev)))
       (equal (tok-name (cadr (member newword (reverse abbrev))))
          'SONS))
      nil)
     ((and (= i 0)
       (member nword '(AND *AMPERSAND*)))
      nil)
     ((and (equal nword '*COMMA*)
       (cdr (member newword abbrev))
       (or (capitalized-p (cadr (member newword abbrev)))
         (member (tok-name (cadr (member newword abbrev)))
          *nocap-name-parts*))
       )
      nil)
     ((equal (tok-name
        (cadr (member newword
        (reverse abbrev)))) '*HYPHEN*)
      nil)
     ((and (= i 1)
       (member nword '(SERVICES GROUP COMPANY)))
      nil)
     (t t))))

(defun ed-test (tok)
  ;; position first whitepace > 2
  (and (null (member (tok-name tok) *ed-stoplist*))
       (and (not (capitalized-p tok))
        (not (member (tok-name tok) *nocap-name-parts*)))
```

```
        (> (or (position-if #'white-space-p (tok-string tok))
               (length (tok-string tok)))
           2)
        (search "ED" (tok-string tok)
                :start2 (- (or (position-if #'white-space-p (tok-string tok))
                               (1+ (length (tok-string tok))))
                           3))
        ))
```

```
;;;;;;;;;;;;;;;;;;;;;;;;;;;;;;;;;;;;;;;;;;;;;;;;;;;;;;;;;;;;;;;;;;;;;;;;;
;;;                                                                   ;;;
;;; Name: make-new-cname                                              ;;;
;;;                                                                   ;;;
;;; Author: Rau                                                       ;;;
;;;         Mon Jun  4 15:06:28 1990                                  ;;;
;;;                                                                   ;;;
;;; Args: newsymbols -- list of words in new company name             ;;;
;;;       cname-stream-out -- output stream                           ;;;
;;;                                                                   ;;;
;;; Description: computes the variations of a company name            ;;;
;;;                                                                   ;;;
;;; Returns: nothing important                                        ;;;
;;;                                                                   ;;;
;;;;;;;;;;;;;;;;;;;;;;;;;;;;;;;;;;;;;;;;;;;;;;;;;;;;;;;;;;;;;;;;;;;;;;;;;
```

```
(defun make-new-cname (newsymbols firstlet cname-stream-out)
  (let ((abbrev nil)
        (acronyms nil)
        (longabbrev nil)
        (symbolvars nil))
    (do ((i 0 (+ i 1)))
        ((= i (length newsymbols)))
      (let* ((current (nth i newsymbols))
             (stringcurrent (string current))
             (firstletter (subseq stringcurrent 0 1))
             (bl (butlast newsymbols i))
             (stringbl (string (car (last bl))))
             (abbrev-flag nil))
        (if (and (> (length stringcurrent) 5)
                 (abbrev-p current))
            (setf abbrev-flag t))
        (if (> (length newsymbols) 1)
            (if (and (null (string-equal firstletter "*"))
                     (null (equal current 'AND))
                     (null (string-equal firstletter "|")))
                (cond ((null abbrev-flag)
                       (setf abbrev (concatenate 'string abbrev firstletter)))
                      (t (if (abbrev-p (car bl))
                             (setf abbrev
                                   (concatenate 'string abbrev
                                                (string
                                                 (remove-first (car bl)))))))
                      ))
            ))
        (if (and (> (length stringbl) 5)
                 (string-equal (subseq stringbl 0 6) 'ABBREV))
            (setf abbrev-flag t)
            (setf abbrev-flag nil))
        (if (novar-cond bl abbrev-flag)
            (if (and (cdr bl)
                     (null stringcurrent))
                (push (cdr bl) symbolvars)
                (push bl symbolvars)))))
    (if abbrev (setf longabbrev (concatenate 'string abbrev firstlet)))
```

```
      (if (> (length symbolvars) 4)
    (setf symbolvars (subseq symbolvars 0 4)))
       (if (and longabbrev
           (null (member longabbrev *abbrev-stoplist* :test 'string-equal)))
    (push (intern longabbrev) acronyms))
       (if (and abbrev
           (null (member abbrev *abbrev-stoplist* :test 'string-equal))
           (null (= (length abbrev) 1)))
    (push (intern abbrev) acronyms))
       (if symbolvars
    (save-new-cname symbolvars acronyms cname-stream-out))
       ))
```

```
;;;;;;;;;;;;;;;;;;;;;;;;;;;;;;;;;;;;;;;;;;;;;;;;;;;;;;;;;;;;;;;;;;
;;;                                                             ;;;
;;; Name: save-new-cname                                        ;;;
;;;                                                             ;;;
;;; Author: Rau                                                 ;;;
;;;         Mon Jun  4 15:07:16 1990                            ;;;
;;;                                                             ;;;
;;; Args:  vars -- list of company name variations              ;;;
;;;        acronyms -- list of acronyms for the company name    ;;;
;;;        cname-stream-out -- output stream                    ;;;
;;;                                                             ;;;
;;; Description: defines a new cname with its variations and acronyms ;;;
;;;              and writes it to file (*cname.out*)            ;;;
;;;                                                             ;;;
;;;;;;;;;;;;;;;;;;;;;;;;;;;;;;;;;;;;;;;;;;;;;;;;;;;;;;;;;;;;;;;;;;
```

```
(defun form-cname-symbol (tokens)
  (apply #'concat
    (mapcan #'(lambda (tok)
        (list (if (abbrev-p tok)
            (remove-first tok)
            tok)
          '-))
      tokens)))

(defun save-new-cname (vars acronyms cname-stream-out)
  (declare (ftype (function (t) t) def-lex-entry pr-lex-exp))
  (declare (special *new-cname* *cname-p*))
  (setf *new-cname* t)
  (let ((official-name (form-cname-symbol (car (last vars))))
    (nametype nil)
    (entry nil))
    (setf vars (delete (list official-name) vars :test #'equal))
    (unless (company-p official-name)
      (if (holding-company-p vars)
      (setf nametype 'hcname)
      (setf nametype 'cname)))
    (mdebug :cnames "~%*** Defining new ~s: ~a ~%" nametype official-name)
    (mdebug :cnames "   Variations: ~a ~%" vars)
    (mdebug :cnames "   Acronyms: ~a ~%" acronyms)
    (setf entry
      `(,official-name
        :POS ,nametype
        :ACRONYMS ,acronyms
        :TOKENS ,vars))
    (pr-lex-exp entry cname-stream-out)
    (def-lex-entry entry :mode :temp))
  ))
```

What is claimed is:

1. A method, for practice on a computer, for extracting company names from text comprising the steps of:
scanning said text for a company name indicator;
reading words backwards through said text until a stop condition comprising reading a word which is on a stop list occurs; and
extracting the words read by said computer, before the stop condition occurred.

2. A method, for practice on a computer, for extracting company names from text comprising the steps of:
scanning said next for a company name indicator;
determining if there is parallel sentence structure in the text including said company name indicator;
reading words backwards through said text until a stop condition occurs; and
extracting the words read by said computer, before the stop condition occurred.

3. A method, for practice on a computer, for extracting company names from text comprising the steps of:
scanning said text for a company name indicator;
determining if a verb following said company name indicator is plural;
reading words backwards through said text until a stop condition occurs; and
extracting the words read by said computer, before the stop condition occurred.

* * * * *